Nov. 22, 1949     M. C. TEAGUE     2,488,993
SEAT

Filed Sept. 19, 1944     2 Sheets-Sheet 1

INVENTOR.
MERWYN C. TEAGUE
BY Lester J. Bradley
ATTORNEY

Nov. 22, 1949     M. C. TEAGUE     2,488,993
SEAT

Filed Sept. 19, 1944     2 Sheets-Sheet 2

INVENTOR.
MERWYN C. TEAGUE
BY Lester J. Budley
ATTORNEY

Patented Nov. 22, 1949

2,488,993

UNITED STATES PATENT OFFICE 2,488,993

SEAT

Merwyn C. Teague, Ridgewood, N. J., assignor to United States Rubber Company, New York, N. Y., a corporation of New Jersey Application September 19, 1944, Serial No. 554,737

4 Claims. (Cl. 155—179)

1

This invention relates to vehicle seats and particularly to vehicle seats using pneumatic or inflated cushions, this application being a continuation in part of my copending application Serial Number 427,886, filed January 23, 1942, which has matured into Patent No. 2,367,628.

Attempts have been made by others to provide a comfortable vehicle seat by utilizing the inherent resilience and self-fitting characteristics of inflated elastic cushions for example of the constructions shown by Sampson in Patent 1,993,228 and O'Dell in Patent 2,239,300. Vehicle seats using such inflated cushions are customarily covered with cloth upholstery not only for sake of appearance but also to unite the various elements of the seat, such as cushions and supporting frame, into a single structure which can be removed and handled as a unit. Such cloth while soft and pliable is not elastic or stretchable. Contrary to expectation these cushions have been found by actual measurement of the pressure between a cushion and passenger to exert varying pressures on the passenger at varying points or areas over the entire area of contact. This produces points or small areas of high pressure which although not painful nor immediately uncomfortable, nevertheless insiduously accelerate fatigue on long drives.

I have found that elimination of such points of high pressure materially retards or reduces fatigue, and I have found that these points of high pressure can be eliminated or reduced by making the customary upholstery covering of the seat of elastic sheet material rather than the usual inelastic cloth. Accordingly it is one of the objects of my invention to provide a pneumatic elastic cushion in which the variation of pressure from point to point of the seat of the passenger is reduced to a minimum.

Also while seats embodying such cushions are reasonably comfortable against vibrations of small amplitude such as are caused by jiggling of the vehicle on mildly rough roads, the seats have been unsatisfactory when very hard bumps have been encountered. If the cushion has a low elastic modulus and is inflated to a low pressure, which permits the deformation of the cushion to absorb large amplitude vibrations at comfortable pressures, then the cushion is unstable and wobbles or slews excessively during smooth driving, and when the car strikes a bump the passenger is apt to strike the support below the cushion, or hit bottom, causing an uncomfortable or painful jolt. Also absorption of jolts at comfortable pressures may require an uncomfortable extent of

2 movement. Furthermore there is not room in cars of modern design to permit a depth of cushion, or range of movement which will absorb the jolt without striking bottom. On the other hand, if the cushion has a high elastic modulus and is inflated to a pressure sufficiently high to prevent striking bottom, then the cushion continually appears hard and uncomfortable to the passenger.

While Sampson has taken steps to overcome this inherent disadvantage of pneumatic cushions by placing resilient supports under an inflated cushion, such supports require a great depth not available in compact seats, and require a larger range of movement in absorbing heavy jolts than is comfortable. It is another object of my invention to provide an improved resilient support which is more compact and more economical to construct than those heretofore known and one which has improved load-deflection characteristics.

Other objects and advantages of my invention will be apparent from the accompanying description and drawings, in which.

Figure 2:
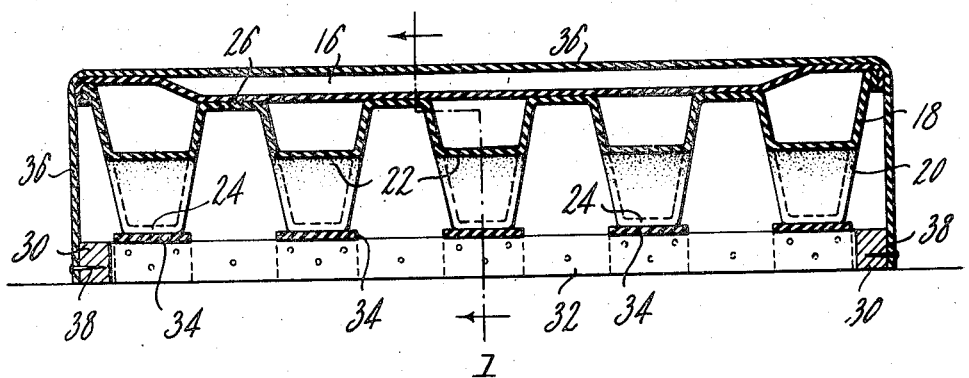
Fig. 2 is a vertical transverse section of the cushion on the line 2—2 of Fig. 1.
Figure 3:
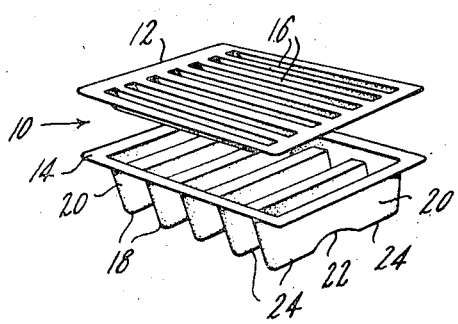
Fig. 3 is a perspective exploded view of the bladder or cushion of the seat before assembly.

Referring to the drawings, 10 designates a bladder or cushion proper, which may be constructed as indicated in Fig. 3. An upper half 12 and lower half 14 are formed as molded sheets of rubber having suitable elastic modulus. The upper half 12 has a relatively large number of relatively small ribs 16, the tops of which collectively constitute the passenger-supporting surface of the cushion. The lower half has a relatively small number of relatively large depending lobes 18 having side walls 20 extending through a substantial vertical height. The lobes may be tapered as shown in Fig. 2, formed with arches 22 and have lower or bottom surfaces 24 which collectively support the entire cushion. The two halves 12 and 14 are vulcanized together around their edges to form an air tight container and the portions between the ribs 16 which cross the lobes 18 are attached to the portion of the lower half between the lobes as indicated at 26 in Fig. 2 so that the ribs form ducts 27 connecting the lobes. The cushion is provided with a valve stem 28 by which it may be inflated to the desired pressure.

Figure 1:
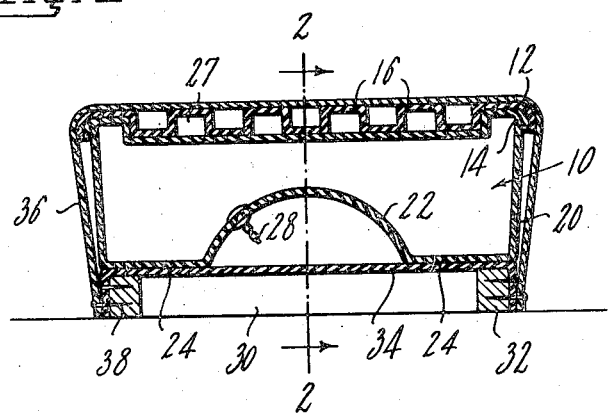
Fig. 1 is a vertical section of a seat embodying my invention, the section being taken on the section line 1—1 of Fig. 2.

The seat has a base, preferably including any suitable supporting frame, formed for example, by longitudinal members 30 and cross members 32 which may be made of wood, and individual longitudinal supports 34 having appreciable free space beneath them, as shown in Fig. 1 and extending preferably from front to back of the frame, that is, longitudinally of the vehicle in which the frame is to be placed. There is an individual support 34 for each lobe of the cushion, thus the cushion rests directly upon the supporting base, and due to the height of its sidewalls 20, the load-supporting surface is remote from the base.

Both for the sake of appearance, and in order to hold the cushion and frame assembled as a unitary structure, cushions of this character are commonly covered with a sheet of upholstery material secured to the frame. In vehicle seats heretofore constructed this upholstery fabric, usually cloth and consequently relatively inelastic, is frequently applied over a layer of padding such as hair or cotton wadding.

Considering the static comfort of any seat, that is the feeling of the seat to the passenger when the car is stationary and without considering deflection or damping characteristics, the most comfortable seat is one which exerts the lowest maximum pressure on the body of the passenger. This means not only that the seat conforms to the curves of the passenger, but in addition does not have any points or areas of high pressure. In elastic cushions, the area of contact between the passenger and the cushion does not change appreciably with varying pressure such as occurs when the car strikes a bump. Consequently a passenger has a substantially constant area of contact with the seat. Therefore if the pressure is uniform, the pressure on all spots will be the lowest possible and points of high pressure will be avoided. The elimination of such points of high pressure is important in reducing fatigue on long drives.

If a naked passenger could sit directly on an elastic inflated bag, the pressure on the area of contact between the passenger and the bag would be substantially uniform, but as a practical matter it is impossible to obtain this theoretically perfect condition, and in most cases there is a large variation of pressure from point to point on the person of the passenger. Actual measurements of pressure between passenger and cushion under widely varying conditions show that the variation of pressure from point to point increases with the amount of inelastic material interposed between the surface of the elastic cushion and the skin of the passenger. I have found that covering the pneumatic cushion with elastic upholstery material instead of the customary inelastic material markedly decreases the variation of pressure over the area of contact and markedly reduces the pressure at points of relatively high pressure, thus improving the comfort of the seat and preventing fatigue. I believe this is due to the condition that the elastic covering can stretch at different points over the cushion and to the condition of the load-supporting portion of this cover being remote from the lower supporting surface of the cushion, permitting adequate stretching and conforming to various conditions, thus permitting a closer approach to the theoretically perfect condition of a naked passenger sitting on an elastic inflated bag.

Accordingly, I cover the cushion with a sheet of elastic material 36, preferably one which is elastic in both directions that is, a sheet having the elastic or stretching properties of thin gum rubber. Since the feel and appearance of pure gum rubber are objectionable, I prefer to use a material such as that marketed under the trade name "Luvon," an elastic material which has the appearance and feel of cloth, but is stretchable or elastic in both directions, having in this respect the characteristics of sheet rubber. A part of the advantage of this material may be obtained by using a material which stretches in one direction only, there being many composite rubber and cloth fabrics having this characteristic. The elastic sheet is stretched with the desired tension over the inflated cushion, brought down over the sidewalls and tacked to the edges of the frame as at 38. This arrangement results in the elastic sheet being secured to the frame along lines which are remote from or substantially below the load-supporting surface of the cushion and the inherent elasticity of the cover between the passenger and the load-supporting surface permit the cover to stretch and move in adjusting itself to the passenger independently of the cushion itself.

Figure 4:
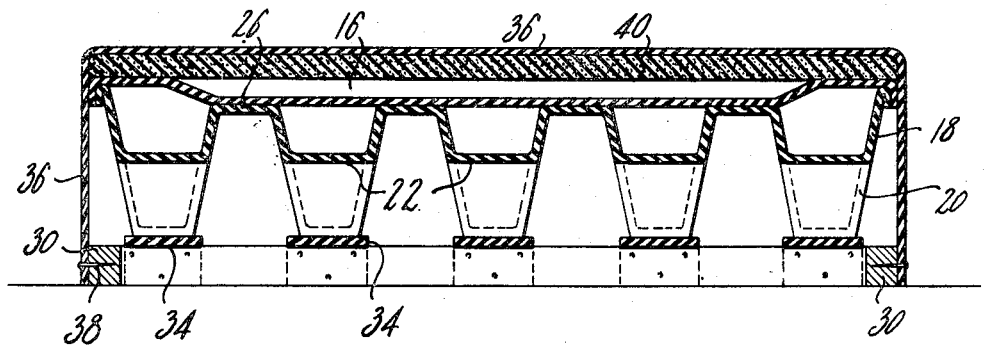
Fig. 4 is a view corresponding to Fig. 1 showing a modified form of my invention.

Seats having inflated cushions as shown in Fig. 1 frequently are objectionable in appearance because the surface looks wrinkled due to lack of support for the cover between the ribs 16. To overcome this objection, I provide an elastic cover having a thick central portion 40 as shown in Fig. 4, substantially coextensive with the top of the cushion and being sufficiently thick to prevent apparent sagging of the cover between the ribs. The thickened portion is preferably a highly elastic sponge rubber pad and this may vary in thickness from about ¼ inch to about an inch. It may be secured to the elastic sheet by cementing or it may be merely laid between the elastic sheet and the cushion. From the standpoint of comfort alone, a thin elastic sheet applied directly to a thin elastic cushion wall is somewhat superior to a cushion with an elastic cover having an elastic thickened portion. However, nearly all of the comfort advantage of my invention can be had if the pad 40 is used, with the additional advantage of better appearance, as long as the elastic sheet cover is used in combination with the pad and the inflated cushion.

I have also found that I can use a pad of tulatex instead of the sponge rubber and still retain most of the comfort advantages of the invention. Tulatex is an open elastic felt consisting of fibers of the tula plant coated with rubber and loosely matted together. I have also found that much of the comfort advantage of the invention is retained if the thickened central portion or pad, although not elastic, is of soft yieldable material, particularly material which will yield in a direction parallel to the plane of the seat as well as perpendicular to it. Such a suitable material is cotton batting.

Figure 5:
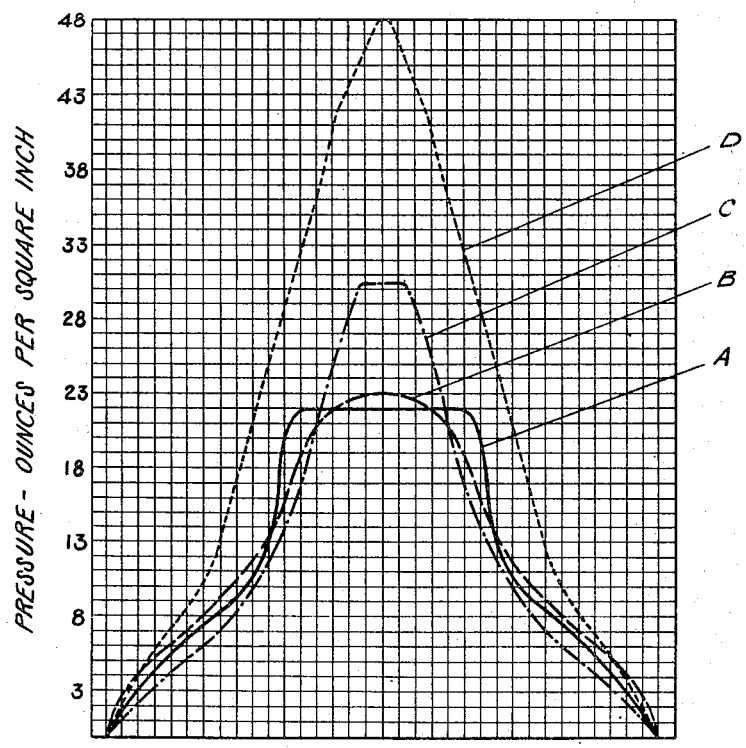
Fig. 5 is a group of curves showing pressures obtained with seats of varying construction embodying the invention, compared with a conventional seat.

In Fig. 5 I have shown actual values of the pressure between a passenger and various seats which are identical except for variation in the pad or thickened central portion of the elastic cover. In these curves the pressures in ounces per square inch are plotted as ordinates, and positions across the seat from side to side along a median line of the passenger are plotted as abscissae.

Curve A shows actual pressures exerted by a seat constructed as shown in Fig. 1. Curve B represents the pressures of a seat having a highly stretchable sponge rubber pad between the inflated cushion and the cover as shown in Fig. 4. It will be observed that curve B rises to a very slightly higher maximum pressure and that the top of the curve is slightly narrower than A. However the differences are not sufficient to detract significantly from the comfort of the seat and these curves show the seat having the sponge rubber pad to be very nearly as comfortable as the seat with no pad.

Curve C shows actual pressures exerted by a seat constructed as shown in Fig. 4 having a cotton batting pad. This both raises the maximum pressure and narrows the flat top of the curve indicating that the seat is pressing harder on the spine region of the passenger. However, the seat with the cotton pad is still within comfortable limits, since the maximum pressure is only thirty ounces per square inch, as compared to 22 for the thin elastic sheet alone.

To compare the comfort of my improved seat with seats having a conventional inelastic cover, there is plotted in curve D the actual pressures exerted by a seat constructed as in Fig. 4 but having a cotton pad and a conventional leatherette cover. It will be noticed that the curve rises to a sharp point and a high value of 48 ounces per square inch at the center, indicating uncomfortably high pressure at the spine region of the passenger.

The integrated values of the curves are not the same as might be expected on superficial examination for the reason that these curves show pressures in a narrow zone or single line. While the total weight exerted by the passenger on the cushion is identical in all cases, since this weight is distributed over a two dimension area, the curves showing a pressure across a single line cannot have the same integrated areas.

Many of the advantages of my invention are obtained to a high degree with a pneumatic elastic cushion and an elastic cover regardless of the type of support of the individual lobes 18 of the cushion. Consequently it is within the scope of my invention to use any desired material for the supports 34. However, further improvement and additional advantages are obtained if the supports 34 are elastic rubber straps supported on the frame under tension. A strap is provided for each of the lobes 18 and the straps are held in the proper position and under the desired tension by tacking them to the frame members as shown in Fig. 1. This arrangement materially increases the comfort of the seat on rough roads by increasing the ability of the seat to absorb jolts within a comfortable range of movement and in a comfortable period of time. This is due to the following conditions.

After the seat has taken up the static load of a passenger and viewed from the standpoint of absorbing shocks while the vehicle is in motion, it is desirable theoretically for a seat to deflect in proportion to the load applied. Such a seat may be said to have a constant specific deflection, that is the load-supporting surface goes down the same amount for a given increase in load regardless of the amount of load applied. However, it may be impractical or impossible to provide within the space available in a compact seat for cars of modern design, a construction which has a constant specific deflection especially if the specific deflection has a sufficiently low value to provide adequate comfort. It is well known that pneumatic cushions alone appear uncomfortably hard when a severe bump is encountered. In a cushion supporting a passenger of definite weight the load is suddenly increased when the car strikes a bump. This deflects the upper surface of the cushion by distorting the cushion, which is made possible by the increase of pressure within the cushion and the consequent stretching of the material of which the cushion is made. When the forces in the stretched rubber balance the increased apparent weight of the passenger, stretching of the cushion stops and the cushion at this point feels hard to the passenger unless the force of the jolt has been completely absorbed before this point, the seat is very uncomfortable. It will be apparent that the point at which the cushion thus appears hard depends upon the size, shape and inflation pressure of the cushion as well as upon the modulus of the rubber. Because of practical considerations of available space and requisite stability of the cushion, it is impractical to make a cushion which will in itself comfortably absorb the jolts encountered in ordinary driving. It is for this reason that pneumatic cushions alone made hard seats.

The seat will appear softer and more comfortable to the passenger when bumps are encountered if the cushion as a whole can move against a gradually increasing resistance without appreciable further distortion before the point is reached at which the cushion appears hard. This is effected by the straps. By regulating the specific deflection of the straps 34 through appropriately selecting the initial tension of the straps when stretched on the frame, the width and thickness of the straps and the elastic modulus of their material, the desired gradual increase of resistance can be achieved. Preferably these factors are so adjusted that in the lower range of operating loads the straps have a lower specific deflection than the load-supporting surface of the cushion while in the upper range of operating loads the straps have higher specific deflection than the cushion. In this construction a sudden increase of load applied to the cushion by the weight of the passenger when the car strikes a bump is absorbed simultaneously by the cushion and the strap. However during different portions or periods of time in the total deflection of the seat, different proportions of the deflection are absorbed by the cushion and by the straps. As the load starts to increase, the pressure of air in the cushion increases and the straps stretch, but in this initial stage the load-supporting surface of the cushion itself is permitted to deflect by distortion of the cushion to a much greater extent than the deflection of the straps. At an intermittent point in the deflection of the upper surface of the cushion the pressure of the confined air reaches a value at which cushion feels uncomfortably hard to the passenger, but before this point is reached the specific deflection of the straps exceeds the specific deflection of the cushion. Consequently the remainder of the jolt is absorbed by stretching of the straps, the cushion moving as a whole without further appreciable distortion. This permits an adequate deflection of the load-supporting surface of the cushion without increasing unduly the apparent hardness of the cushion.

The space beneath the strap provided by the thickness of the frame members 30 permits the strap to stretch sufficiently to absorb ordinary jolts. This arrangement provides a compact seat of low vertical height and it provides a seat which is stable against undue softness or crumpling at the edges.

I claim:

1. A seat construction comprising in combination a supporting base, an inflated elastic cushion having a plurality of pneumatically interconnected depending lobes supported on the base, the cushion having side walls and having an upper load-supporting surface remote from the base and adapted to support a substantially vertical load, and an elastic cover stretched under tension across said load-supporting surface and downwardly along the side walls of the cushion sufficiently to prevent wrinkling of said surface upon application of normal loads thereto, the edges of the cover being secured to the base along lines susbtantially below the load-supporting surface to hold the cushion and base in assembled relationship, and the entire cover except the edges being free to move and to stretch with respect to the surfaces of the cushion.

2. A seat construction comprising in combination a supporting base including a plurality of spaced parallel supports fixed to the base and having free space beneath them, an inflated elastic cushion having a plurality of pneumatically interconnected depending lobes, the number of lobes being equal to the number of supports and one lobe resting on each support, said cushion having side walls and having an upper load-supporting surface substantially above the base, and an elastic cover stretched under tension over said load-supporting surface and downwardly along the side walls of the cushion sufficiently to prevent wrinkling of said surface upon application of normal loads thereto, the edges of the cover being secured to the base along lines substantially below the load-supporting surface to hold the cushion and base in assembled relationship, the entire cover except the edges being free to move and stretch with respect to the surfaces of the cushion.

3. A seat construction comprising in combination a rigid supporting frame, a plurality of elastic straps extending in parallel relationship across the frame and secured under tension to the frame, an inflated elastic cushion resting on the straps, said cushion having a plurality of pneumatically interconnected depending lobes, the number of lobes being equal to the number of straps and one lobe resting on each strap, said cushion having side walls and having an upper load-supporting surface substantially above the frame, and an elastic cover stretched under tension over said load supporting surface and downwardly along the side walls of the cushion sufficiently to prevent wrinkling of said surface upon application of normal loads thereto, the edges of the cover being secured to the frame along lines substantially below the load-supporting surface to hold the cushion and frame in assembled relationship, the entire cover except the edges being free to move and stretch with respect to the surfaces of the cushion.

4. A seat construction comprising in combination a supporting base, an inflated cushion supported on the base, the cushion having side walls and having an upper load supporting surface substantially above the base and adapted to support a substantially vertical load, and an elastic cover stretched under tension across said load supporting surface and downwardly along the side walls of the cushion sufficiently to prevent wrinkling of said surface upon application of normal loads thereto, the edges of the cover being secured to the base along lines substantially below the load supporting surface to hold the cushion and base in assembled relationship, and the entire cover except the edges being free to move and to stretch with respect to the surfaces of the cushion, said cover including an elastic sheet and an elastic central portion which is relatively thick with respect to the sheet, the central portion being disposed over the load supporting surface of the cushion.

MERWYN C. TEAGUE.

REFERENCES CITED

The following references are of record in the file of this patent:

UNITED STATES PATENTS

| Number | Name | Date |
|---|---|---|
| 1,755,205 | Christensen | Apr. 22, 1930 |
| 1,823,569 | Mellano | Sept. 15, 1931 |
| 1,877,055 | Ruppert | Sept. 13, 1932 |
| 1,928,155 | Kletsky | Sept. 26, 1933 |
| 1,928,675 | Sampson | Oct. 3, 1933 |
| 1,982,516 | Holmested | Nov. 27, 1934 |
| 1,993,228 | Sampson | Mar. 5, 1935 |
| 2,012,042 | Gerlofson | Aug. 20, 1935 |
| 2,239,300 | O'Dell | Apr. 22, 1941 |
| 2,251,318 | Blair | Aug. 5, 1941 |
| 2,272,885 | Rathbun | Feb. 10, 1942 |
| 2,314,608 | Cunningham | Mar. 23, 1943 |
| 2,367,628 | Teague | Jan. 16, 1945 |

FOREIGN PATENTS

| Number | Country | Date |
|---|---|---|
| 408,639 | Great Britain | Apr. 9, 1934 |
| 448,367 | Great Britain | June 8, 1936 |